United States Patent
Tonry et al.

(10) Patent No.: US 12,204,417 B2
(45) Date of Patent: Jan. 21, 2025

(54) IMPROVING RESTORATION OF FIRMWARE DATA

(71) Applicant: DELL PRODUCTS L.P., Round Rock, TX (US)

(72) Inventors: Richard M. Tonry, Georgetown, TX (US); Balasingh P. Samuel, Round Rock, TX (US); Nicholas Grobelny, Evergreen, CO (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 17/972,522

(22) Filed: Oct. 24, 2022

(65) Prior Publication Data
US 2024/0134756 A1   Apr. 25, 2024
US 2024/0232026 A9   Jul. 11, 2024

(51) Int. Cl.
*G06F 11/14* (2006.01)
*G06F 9/4401* (2018.01)

(52) U.S. Cl.
CPC ........ *G06F 11/1469* (2013.01); *G06F 9/4403* (2013.01); *G06F 2201/84* (2013.01)

(58) Field of Classification Search
CPC . G06F 11/1469; G06F 9/4403; G06F 2201/84
See application file for complete search history.

(56) References Cited

U.S. PATENT DOCUMENTS

| | | | |
|---|---|---|---|
| 9,851,985 B2 | 12/2017 | Martinez et al. | |
| 10,338,933 B2 * | 7/2019 | Samuel | G06F 9/4411 |
| 10,733,288 B2 * | 8/2020 | Jeansonne | G06F 21/575 |
| 10,776,488 B2 * | 9/2020 | Samuel | G06F 9/4401 |
| 11,650,887 B2 * | 5/2023 | Samuel | G06F 11/1464 |
| | | | 714/19 |
| 11,775,648 B2 * | 10/2023 | Suryanarayana | G06F 16/188 |
| | | | 713/2 |
| 2013/0080758 A1 | 3/2013 | Hentosh et al. | |
| 2016/0055068 A1 * | 2/2016 | Jeansonne | G06F 21/572 |
| | | | 714/15 |
| 2020/0301719 A1 | 9/2020 | Castillo et al. | |
| 2022/0357960 A1 * | 11/2022 | Chou | G06Q 20/202 |

* cited by examiner

*Primary Examiner* — Brian T Misiura
(74) *Attorney, Agent, or Firm* — Larson Newman, LLP

(57) ABSTRACT

A basic input/output system (BIOS) determine whether an automated recovery mechanism is enabled in response to a detection of a data corruption. An embedded controller may extract recovery data from a storage device upon confirmation that the automated recovery mechanism is enabled. In response to verification that the recovery data is valid, the controller may decrypt a BIOS firmware data in the recovery data and push the BIOS firmware data into a non-volatile random access memory, and decrypt an embedded controller firmware data in the recovery data and push the embedded controller firmware data into the non-volatile random access memory.

20 Claims, 6 Drawing Sheets

IMPROVING RESTORATION OF FIRMWARE DATA

FIELD OF THE DISCLOSURE

The present disclosure generally relates to information handling systems, and more particularly relates to improving the restoration of firmware data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A basic input/output system (BIOS) determines whether an automated recovery mechanism is enabled in response to a detection of a data corruption. An embedded controller may extract recovery data from a storage device upon confirmation that the automated recovery mechanism is enabled. In response to verification that the recovery data is valid, the controller may decrypt a BIOS firmware data in the recovery data and push the BIOS firmware data into a non-volatile random access memory, and decrypt an embedded controller firmware data in the recovery data and push the embedded controller firmware data into the non-volatile random access memory.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
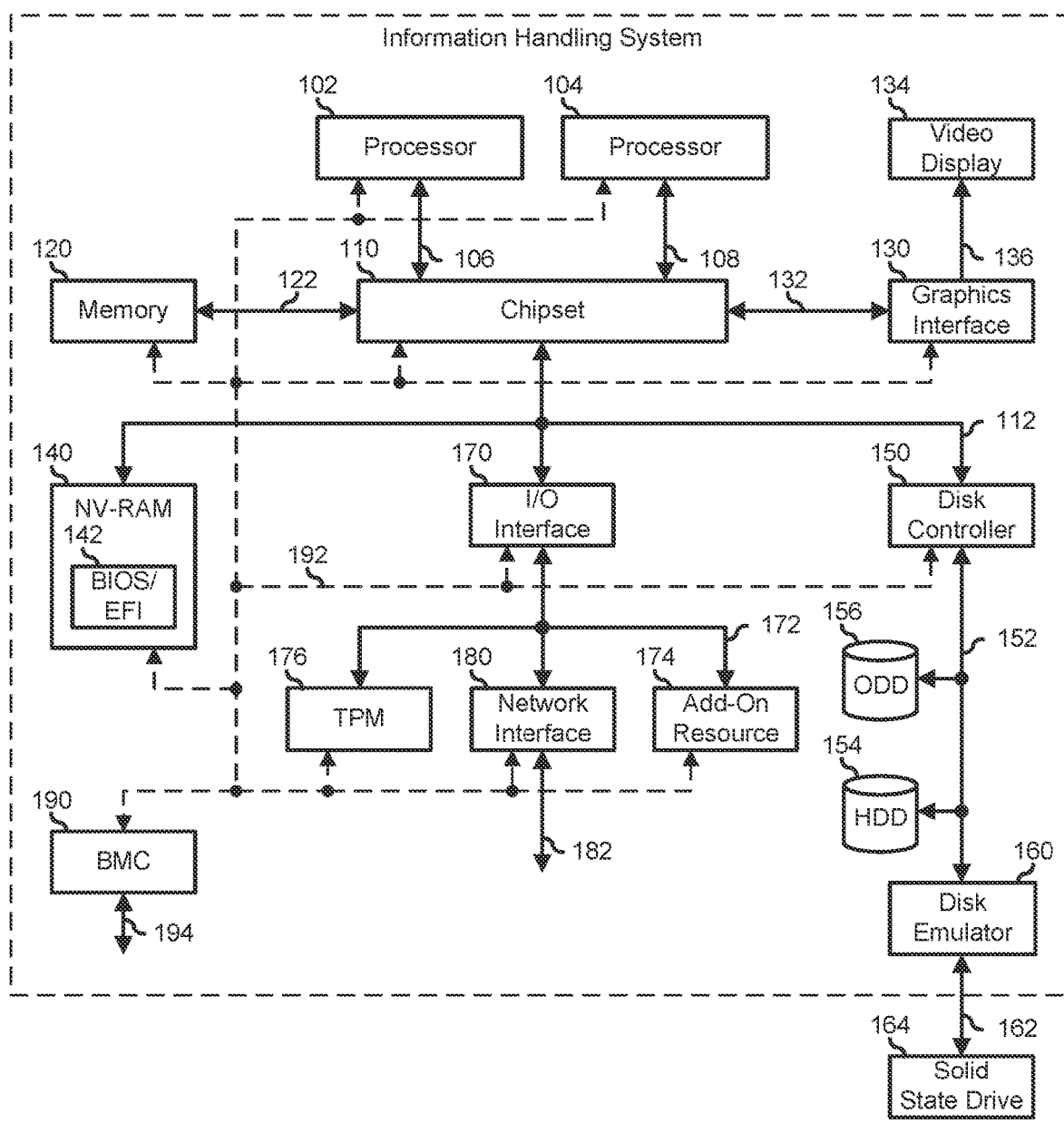
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a double data rate (DDR) memory channel and memory 120 represents one or more DDR dual in-line memory modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to an HDD 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller. A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Firmware, such as BIOS/EFI 142, stores data as part of its operation. The firmware data includes platform configuration data set in the factory before shipping, customer configuration data based on the BIOS setup settings the customer chooses, customer passwords, password hashes, etc. The firmware data of a firmware code is typically stored on the same flash storage device as the firmware code. As such, the firmware data is also susceptible to corruption via random events or tampering attacks. For example malicious software or actor may perform unauthorized changes to the firmware data, such as changing or tampering with manufacturing information, customer configuration settings, factory configuration, platform identification, password metadata, etc. For example malicious software can retrieve a service tag, hardware identification tag, etc. of the information handling system. The malicious software can also override BIOS password protections. These malicious attacks include non-repudiation attacks, wherein the malicious software copies the firmware data from another platform or reuses outdated data from the same platform as a restoration mechanism to hide indicators of attack or compromise.

The inventors have recognized that when corruption or malicious attack is detected, such as when an indicator of attack is detected on firmware data, that data can no longer be trusted. As such, a mechanism to restore the firmware data to a trusted state with the various platform and customer configuration settings intact is desirable. Accordingly the present disclosure addresses the above issues among others by providing a system and method to perform an automated recovery mechanism to restore the platform to the last known trusted state.

Figure 2:
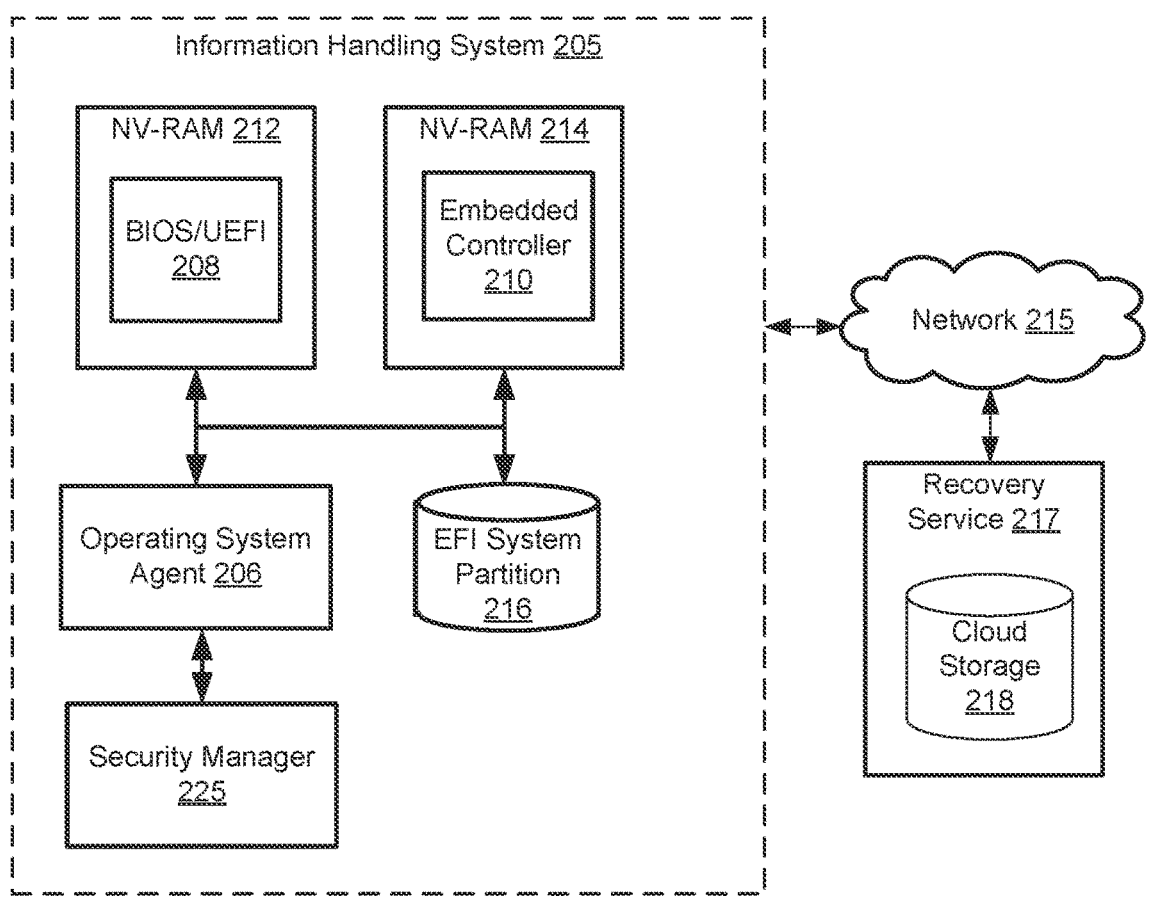
FIG. 2 is a block lane diagram illustrating a system for improving the restoration of firmware data, according to an embodiment of the present disclosure.

FIG. 2 shows an environment 200 for improving the restoration of firmware data. Environment 200 may include an information handling system 205 that is communicatively coupled to a recovery service 217 via a network 215, which may be a public network, such as the Internet, a physical private network, a wireless network, a virtual private network (VPN), or any combination thereof. Information handling system 205 includes an NV-RAM 212, an NV-RAM 214, an operating system agent 206, an EFI system partition 216, and a security manager 225. Recovery service 217 includes a cloud storage 218. NV-RAM 212, which is similar to NV-RAM 142 of FIG. 1, stores firmware data associated with BIOS/unified EFI (UEFI) 208 firmware. NV-RAM 214 stores firmware data associated with embedded controller 210. Both NV-RAM 212 and NV-RAM 214 are memory regions in a non-volatile storage device, such as an SPI flash memory.

Recovery service 217 may be a web service configured to include, manage, and maintain a data store or library that includes recovery images to restore platform and customer configuration settings, among others. The data store or library may be stored in a storage device, such as cloud storage 218, which may be an HDD, SSD, ODD, holographic storage device, or any other storage device that may include data storage capability. Recovery service 217 may be part of an automated recovery mechanism that supports an automated restoration of the firmware data when a data corruption, such as when a malicious attack, data tampering, random data corruption, hardware glitch, etc., is detected. The automated recovery mechanism may be enabled by an administrator which includes an information technology decision maker. For example, the administrator may set a flag to true or one from an initial value of false or zero, respectively.

Various aspects of the automated recovery mechanism may be performed by BIOS/UEFI 208, operating system agent 206, and embedded controller 210 along with recovery service 217. BIOS/UEFI 208 also referred to herein simply as BIOS 208 is similar to BIOS/EFI 142 of FIG. 1. Generally speaking, BIOS 208 includes instructions, some of which may be loaded into memory to facilitate initialization of information handling system 205. Embedded controller 210 which is similar to BMC 190 of FIG. 1 may be a motherboard component of information handling system 205 and may include one or more logic units. Embedded controller 210 may also be referred to as a service processor. Firmware instructions utilized by embedded controller 210 may be used to provide various core functions of information handling system 205, such as power management.

Operating system agent 206, such as an iDRAC service module, is a lightweight software application installed on information handling system 205 used to provide additional systems management. In particular, operating system agent 206 may be configured to assist in the automated recovery mechanism to restore the platform to a trusted state from the last known good version of the firmware data which is stored in a manner that protects it from tampering spoofing, and replay, wherein outdated but previously trusted firmware data is used. For example, operating system agent 206 may be configured to initiate the automated recovery mechanism, when a successful change to firmware data is performed. The automated recovery mechanism may be triggered by a tampering event, which then locates the last known good version of firmware data, also referred to as recovery data, authenticates the recovery data, and uses the authenticated recovery data to restore the configuration settings of the information handling system, among others. As used herein, configuration settings include platform configuration settings and customer configuration settings. Accordingly, configuration data includes platform configuration data and customer configuration data. For example, configuration data may include service tag, BIOS administrator password, password hash, etc. Before using the recovery data for restoration, the data is authenticated to verify integrity, platform identity, and data currency. For example, data currency may be used to ensure that the latest version of the recovery data is used to prevent the replay of outdated firmware data.

An administrator of an information handling system typically updates configuration settings, to meet their requirements. For example, the administrator may update a configuration setting via a BIOS setup utility or a remote manageability interface. In one embodiment, operating system agent 206 may send a notification of the update to BIOS 208 which then initiates a backup of the firmware data as part of the automated recovery mechanism. The backup of the firmware data may also be initiated by BIOS 208 when the change is detected at the pre-boot level, such as when the administrator changes the BIOS password via a BIOS setup utility application.

As part of backing up the configuration settings, BIOS 208 and/or embedded controller 210 may first perform a garbage collection on NV-RAM 212 and NV-RAM 214. The garbage collection operation may be performed to free up storage memory in NV-RAM 212 and NV-RAM 214. BIOS 208 and/or embedded controller 210 may also identify the location and/or addresses of the used and unused memory region in NV-RAM 212, NV-RAM 214, or the rest of the SPI flash memory. The unused or freed-up memory region may also be referred to as an alternate or secondary memory region and may be used as a buffer for hand-off to BIOS 208. After the garbage collection, BIOS 208 may create a snapshot of the firmware data. After which, information handling system 205 may be rebooted by embedded controller 210.

After the reboot, a sequence counter may increment a sequential replay protection value, which may have been initialized to zero at an initial power-on of information handling system 205. The replay protection value may be used in the verification of the recovery image. For example, the replay protection value may be used in signing the recovery image. In another example, the replay protection value may be added to the recovery image prior to transmission and validated upon receipt.

Embedded controller 210 may collect embedded controller configuration or firmware data stored at NV-RAM 214 and encrypt it using an embedded controller unique identifier (UID), service tag, and replay protection value. The embedded controller UID may represent a hardware unique identifier of information handling system 205. The encrypted embedded controller configuration or data may be stored as a binary large object (BLOB) in the secondary memory region. Embedded controller 210 may also collect the BIOS configuration or firmware data, encrypt, and store it as a BLOB in the secondary memory region as well. The BIOS configuration or data may be combined with the embedded controller configuration data as a single BLOB prior to storage. The combination may be referred to as recovery data. The recovery data may be encrypted using the service tag of information handling system 205 and the replay protection value. At this point, embedded controller 210 may release the chipset to boot to the BIOS.

On reboot, BIOS 208 detects that information handling system 205 is in the recovery mode and copies the recovery data from the secondary memory region and stores it in EFI system partition 216. EFI system partition 216 is architecturally shareable in a data storage device, such as an HDD, ODD, SSD, or similar. Embedded controller 210 performs another reboot of information handling system 205. Upon a successful boot to the operating system of information handling system 205, operating system agent 206 then detects that the recovery data exists in EFI system partition 216, copies, and stores the recovery data in a memory region associated with the customer account of information handling system 205 at cloud storage 218.

The above scenario may be performed each time an update to a configuration setting or firmware data is detected. For example, there may be more than one recovery data stored in EFI system partition 216 and cloud storage 218, wherein the last known good recovery data may be used to restore the configuration settings should a malicious attack, data tampering, or similar security issue is detected by security manager 225. Security manager 225 may be a software application configured to detect configuration tampering or corruption, such as a replay protected SPI flash storage, or a custom solution for detection of data integrity. Upon detection of the security issue, security manager 225 may notify BIOS 208 or embedded controller 210 of the issue. BIOS 208 may in turn determine whether the automated recovery mechanism is supported and/or enabled and puts the information handling system in recovery mode prior to notifying embedded controller 210 which confirms whether the automated recovery mechanism is supported. BIOS 208 and/or embedded controller 210 may enable limited or safe boot mode to support locating and reading of EFI system partition 216 during the early phase of the boot process of information handling system 205.

At this point, BIOS 208 may start performing garbage collection of NV-RAM 212 and/or NV-RAM 214 and restore default configuration settings. However, prior to starting the garbage collection process and/or restoring the default configuration settings according to policy, BIOS 208 may notify the user and wait for an acknowledgment to proceed from an administrator of information handling system 205. After the acknowledgment (if required or desired), BIOS 208 may then try to retrieve the recovery data located in EFI system partition 216 and if unavailable from cloud storage 218. Once retrieved, BIOS 208 may then push the recovery data to the secondary memory region and set the recovery flag to embedded controller 210 before rebooting information handling system 205.

Embedded controller 210 detects that a recovery process is in progress and searches the secondary memory region for the recovery data and verifies its validity based on the EC UID, service tag, and replay protection value. After a successful verification, embedded controller 210 decrypts the BIOS configuration data included in the recovery data and verifies its integrity before pushing it to a primary memory region in NV-RAM 212. Similarly, embedded controller 210 decrypts the embedded controller configuration data in the recovery data, verifies its integrity, and pushes it to NV-RAM 214. At this point, embedded controller 210 sets a recovery completion flag to true, logs the event, and reboots information handling system 205. On reboot, BIOS 208 stores the event in the BIOS event log and provides a message that the configuration settings of information handling system 205 have been restored. In some embodiments, the boot process may halt and wait for acknowledgment from the administrator before booting to the operating system. A similar process may be followed when recovery data is retrieved from cloud storage 218 instead of EFI system partition 216. For example, a mutual authentication using public key infrastructure-based challenge/response protocols may be performed between embedded controller 210 and recovery service 217 or cloud storage 218.

In another embodiment, during each configuration setting change action, BIOS 208 signs a change record with a security key associated with the embedded controller UID. Each signed change record may be sent to operating system agent 206 which may then send the signed change record to recovery service 217. Recovery service 217 may be configured as a remote cloud telemetry collection service that verifies each embedded controller signature and saves the signed record in a replay protected database, such as cloud storage 218 upon successful validation.

Similar to the first embodiment, when a malicious attack or data tampering is detected the automated recovery mechanism is initiated. BIOS 208 may attempt to perform a restoration of the configuration settings from EFI system partition 216. If this is unsuccessful, then BIOS 208 may send a recovery request to recovery service 217 along with a generated nonce. Recovery service 217 may assemble previous change records for information handling system 205 into a recovery payload and signs it with the received nonce before transmitting it to BIOS 208. BIOS 208 authenticates the signature of the received recovery payload and verifies the nonce. If authenticated, then BIOS 208 applies the recovery payload and reboots information handling system 205.

Figure 3:
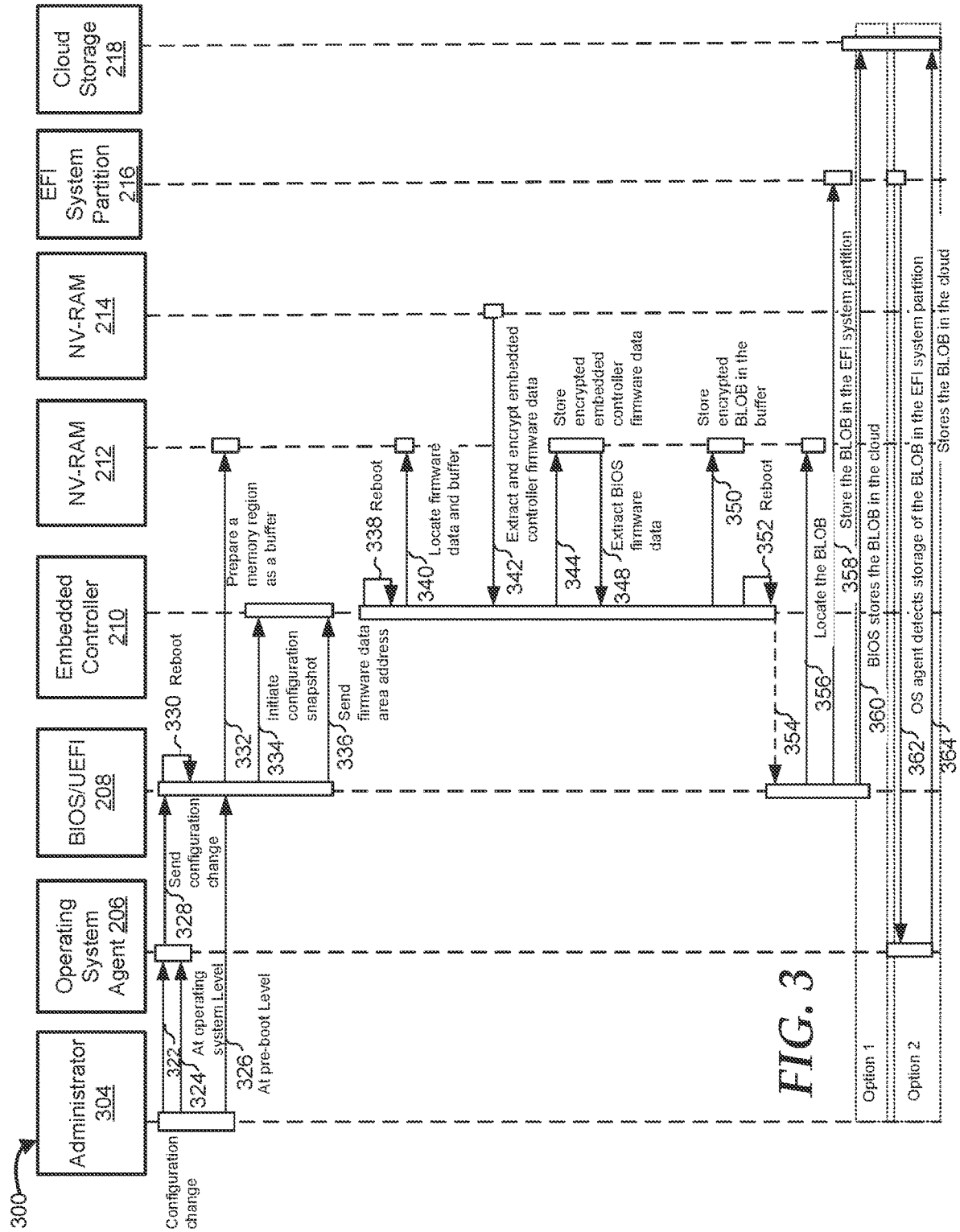
FIG. 3 is a swim lane diagram illustrating a system for saving a snapshot of firmware data, according to an embodiment of the present disclosure.

FIG. 3 shows a swim lane diagram 300 for saving a snapshot of firmware data. Swim lane diagram 300 illustrates a system and operations of a method performed for saving a snapshot of the firmware data. The snapshot may be taken and saved during the initial boot of the information handling system and when information in the firmware data has been updated or changed. At 322, an administrator 304 may set a flag to enable the automated recovery mechanism that allows automated recovery and/or restoration of firmware data. The flag may be referred to as the recovery setting.

At some point, during the normal course of business, administrator 304 may update one or more configuration settings. At 324, administrator 304 logs in at the operating system level of the information handling system and updates a configuration setting. For example, administrator 304 may update a BIOS configuration, such as changing the administrator password. A notification that a change occurred may be transmitted to operating system agent 206 when either one of operations 322 or 324 is performed. Operating system agent 206 upon receipt of the notification in turn notifies BIOS 208 regarding the change in the configuration setting at 328. At 326, administrator 304 logs in at the pre-operating system level of the information handling system. For example, administrator 304 may execute a BIOS setup utility. At this point, administrator 304 may also update a configuration setting similar to operations 322. Because operating system agent 206 is not running at this point, the update of the configuration setting is directed to BIOS 208. At 330, BIOS 208 reboots the information handling system.

At 332, BIOS 208 may initiate a reclaim process and prepare an alternate memory region to be used as the buffer in NV-RAM 212. For example, BIOS 208 may initiate a garbage collection process. At 334, BIOS 208 notifies embedded controller 210 to take a snapshot of the firmware data, which may include operations 340 to 350. At 336, BIOS 208 transmits an address associated with the memory region that holds the firmware data to embedded controller 210. The address of the firmware data may include the address of BIOS firmware data and embedded controller firmware data. BIOS 208 may also transmit the address of the alternate memory region. NV-RAM 212 may be a memory region in an SPI or flash memory where BIOS 208 firmware is stored. NV-RAM 214 may be a memory region in the SPI or flash memory wherein embedded controller 210 firmware is stored. At 338, embedded controller 210 performs a reboot to recovery mode.

At 340, embedded controller 210 locates the firmware data and the alternate memory region based on the address. For example, embedded controller 210 locates the BIOS firmware data and the embedded controller firmware data. In addition, embedded controller 210 locates the alternate memory region and uses it as a buffer. At 342, embedded controller 210 extract and encrypt embedded controller firmware data with embedded controller UID and/or replay protection value. At 344, embedded controller 210 may temporarily store the encrypted embedded controller firmware data at the alternate memory region. At 348, embedded controller 210 may extract and compress BIOS firmware data. Embedded controller 210 may also locate the encrypted embedded controller firmware data at the alternate memory region. The BIOS firmware data may also be referred to as a first firmware data. The encrypted embedded controller firmware data may also be referred to as second firmware data.

Embedded controller 210 may combine the first and second firmware data as a single binary large object (BLOB) and encrypt the combination using the embedded controller UID and the replay protection value. The encrypted BLOB may also be referred to as recovery data. At 350, embedded controller 210 may store the recovery data in the alternate memory region. At 352, embedded controller 210 may reboot the information handling system. At 354, BIOS 208 may be loaded. At 356, BIOS 208 may locate the recovery data in the alternate memory region. At 358, BIOS 208 may save the recovery data in the EFI system partition 216, which may be located in an HDD, SSD, ODD, or similar. At this point, there are two options for the swim lane to proceed; the first option includes operation 360 while the second option includes operations 362 and 364. If the first option is performed, then the second option is not performed, and vice versa. The choice between the two options may be set during the manufacture of the information handling system by administrator 304.

At 360, BIOS 208 may store the recovery data in a cloud storage 218. Cloud storage 218 may be a cloud or customer catalog that stores updates and/or recovery data for the information handling system. At 362, operating system agent 206 may detect the storage of the recovery data in EFI system partition 216. At 364, operating system agent 206 stores the recovery data in cloud storage 218, as part of a customer catalog for example.

Figure 4:
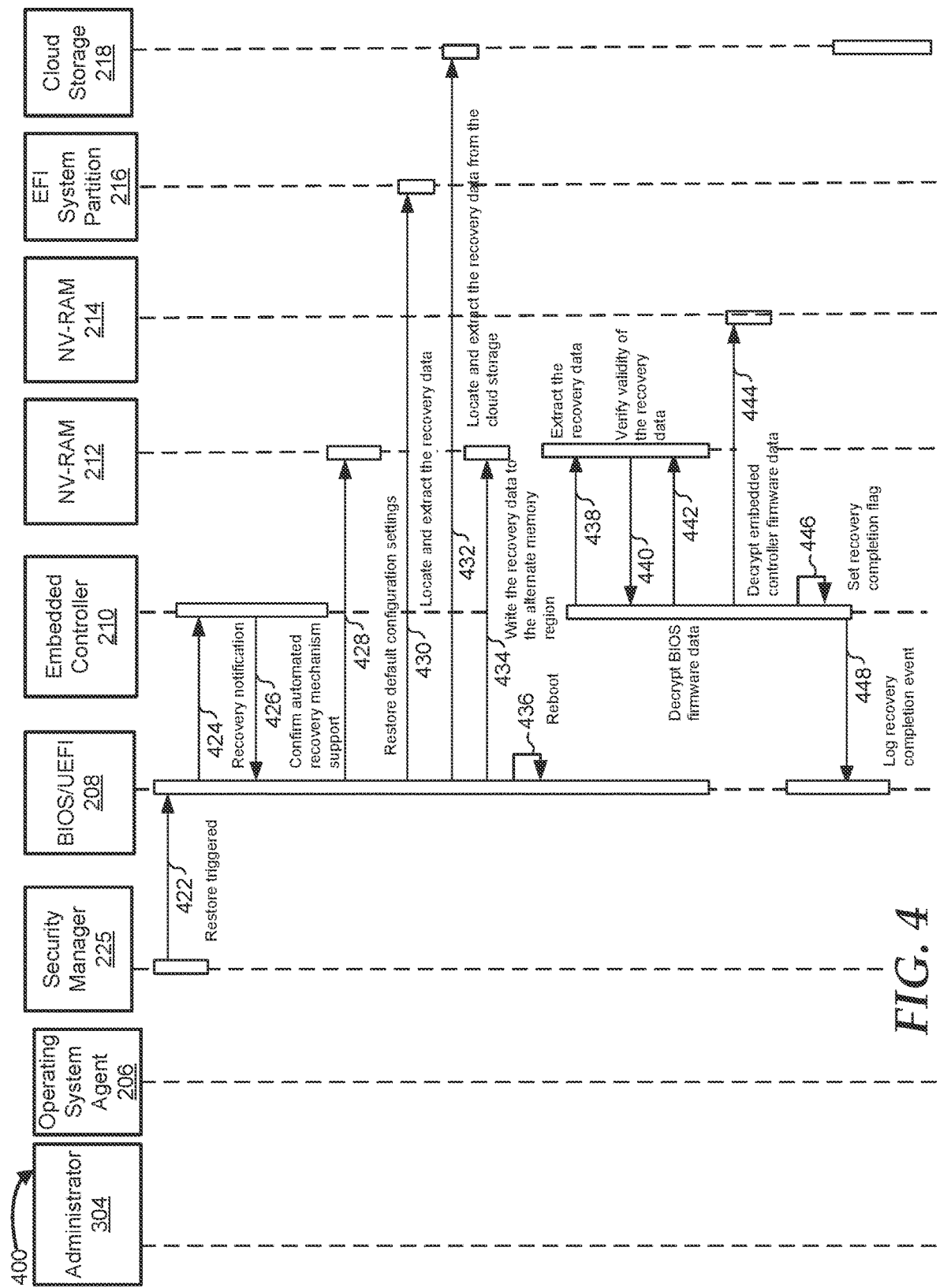
FIG. 4 is a swim lane diagram illustrating a system for restoration of firmware data, according to an embodiment of the present disclosure.

FIG. 4 shows a swim lane diagram 400 for restoring firmware data at an information handling system. At 422, security manager 225 detects a security issue, such as a malicious attack, data tampering, or similar. After detecting the security issue, security manager 225 notifies BIOS 208. At this point, a restore is triggered. At 424, BIOS 208 may check if the automated recovery mechanism is enabled or supported. If the automated recovery mechanism is enabled or supported, then BIOS 208 may notify embedded controller 210 of the restoration. At 426, embedded controller 210 may confirm support for an automated recovery mechanism. If the automated recovery mechanism is not supported, then the swim lane stops.

At 428, BIOS 208 may purge firmware data stored in NV-RAM 212 and restore default configuration settings. In addition, BIOS 208 may set a flag to prevent the information handling system to boot to the operating system of BIOS setup. At 430, BIOS 208 may locate and extract the recovery data that was stored in EFI system partition 216. BIOS 208 may also verify that the recovery data is valid, such as by validating its signature. If the recovery data is not available in EFI system partition 216 or if recovery data fails the verification, then at 432, BIOS 208 may locate the recovery data at cloud storage 218.

At 434, BIOS 208 may write the recovery data to the alternate memory region. At 436, BIOS 208 reboots the information handling system. At 438, embedded controller 210 may extract the recovery data from the alternate memory region in NV-RAM 212. At 440, embedded controller 210 may verify the validity of the recovery data, such as via the embedded controller UID, service tag, and the replay protection value. Subsequent to a successful verification, embedded controller 210 may perform operations 442 and 444. At 442, embedded controller 210 may decrypt the BIOS firmware data included in the recovery data. BIOS firmware data includes the BIOS configuration settings and pushes it to NV-RAM 212. At 444, embedded controller 210 may decrypt the embedded controller firmware data included in the recovery data which includes embedded controller configuration settings and pushes it to NV-RAM 214. At 446, embedded controller 210 may set a recovery mechanism completion flag to indicate successful recovery and restoration of the firmware data. At 448, BIOS 208 may log a recovery completion event to indicate that the firmware data have now been restored.

Figure 5:
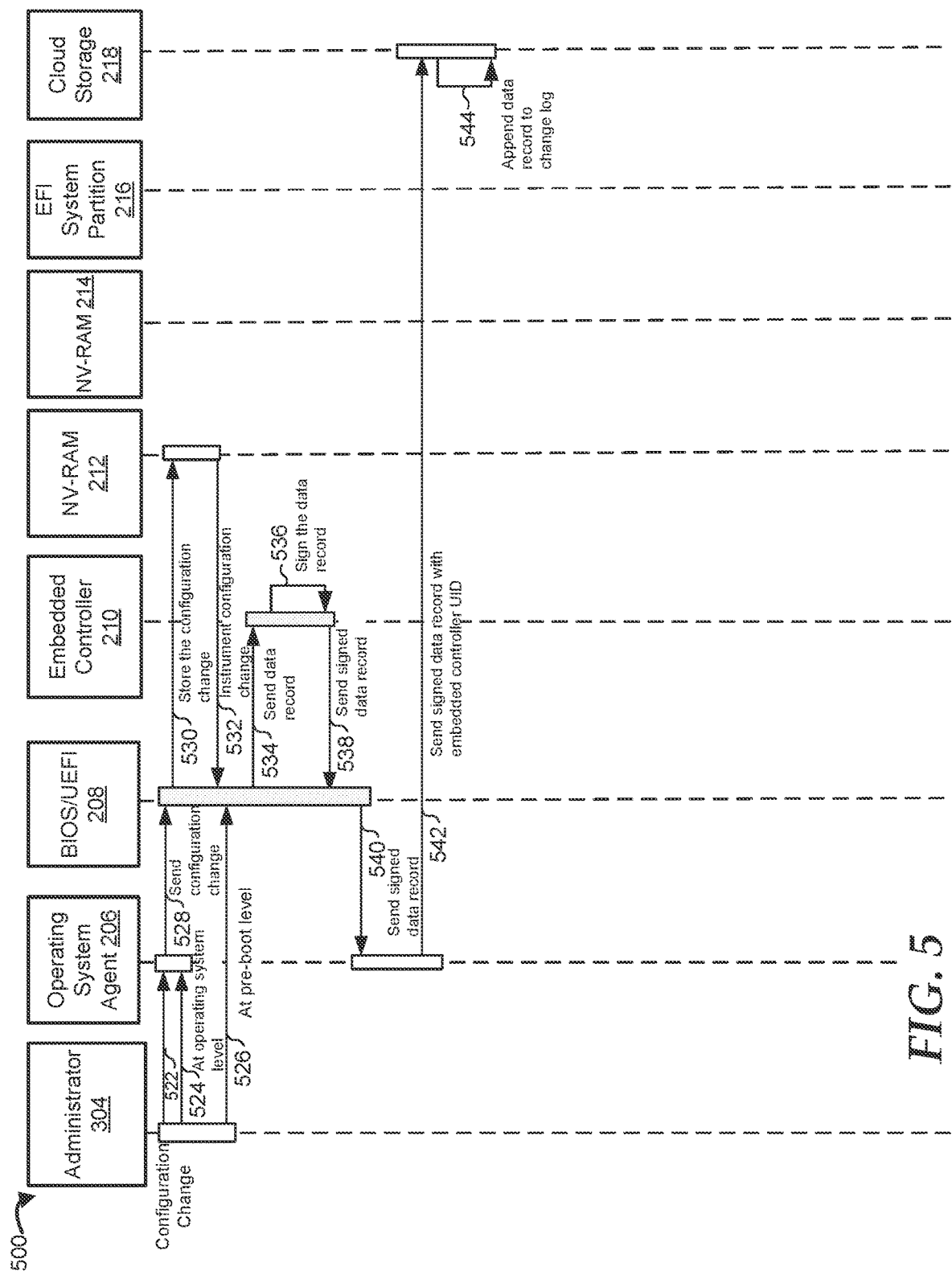
FIG. 5 is a swim lane diagram illustrating a system for saving a snapshot of firmware data, according to an embodiment of the present disclosure.

FIG. 5 shows a swim lane diagram 500 for saving a snapshot of firmware data. At 522, administrator 304 may enable the automated recovery mechanism. Subsequent to enabling the automated recovery mechanism, administrator 304 may update one or more configuration settings. Similarly, at 524, administrator 304 may log in at the operating system level of the information handling system and update a configuration setting. For example, administrator 304 may change or set an administrator password. A notification may be transmitted to operating system agent 206 when either one of operations 522 or 524 is performed. Upon receipt of the notification, operating system agent 206 may in turn transmit a notification regarding the change to BIOS 208.

At 526, administrator 304 logs in at the pre-operating system level of the information handling system. For example, administrator 304 may execute a BIOS setup utility. At this point, administrator 304 may also update or change a configuration setting similar to operations 522 and 524. Because operating system agent 206 is not running at this point, a notification associated with the change may be transmitted to BIOS 208 at 528.

At 530, BIOS 208 may store the changes to the configuration setting at NV-RAM 212. At 532, BIOS 208 may enable instrumentation to be able to collect telemetry data associated with the configuration change. At 534, BIOS 208 sends a data record of the telemetry data to embedded controller 210, which signs the data record at 536 and sends the signed data record to BIOS 208 at 538. At 540, BIOS 208 sends the signed data record to operating system agent 206, which then sends the signed data record to cloud storage 218. At 544, an application running at cloud storage 218 appends a signed data record to a change log.

Figure 6:
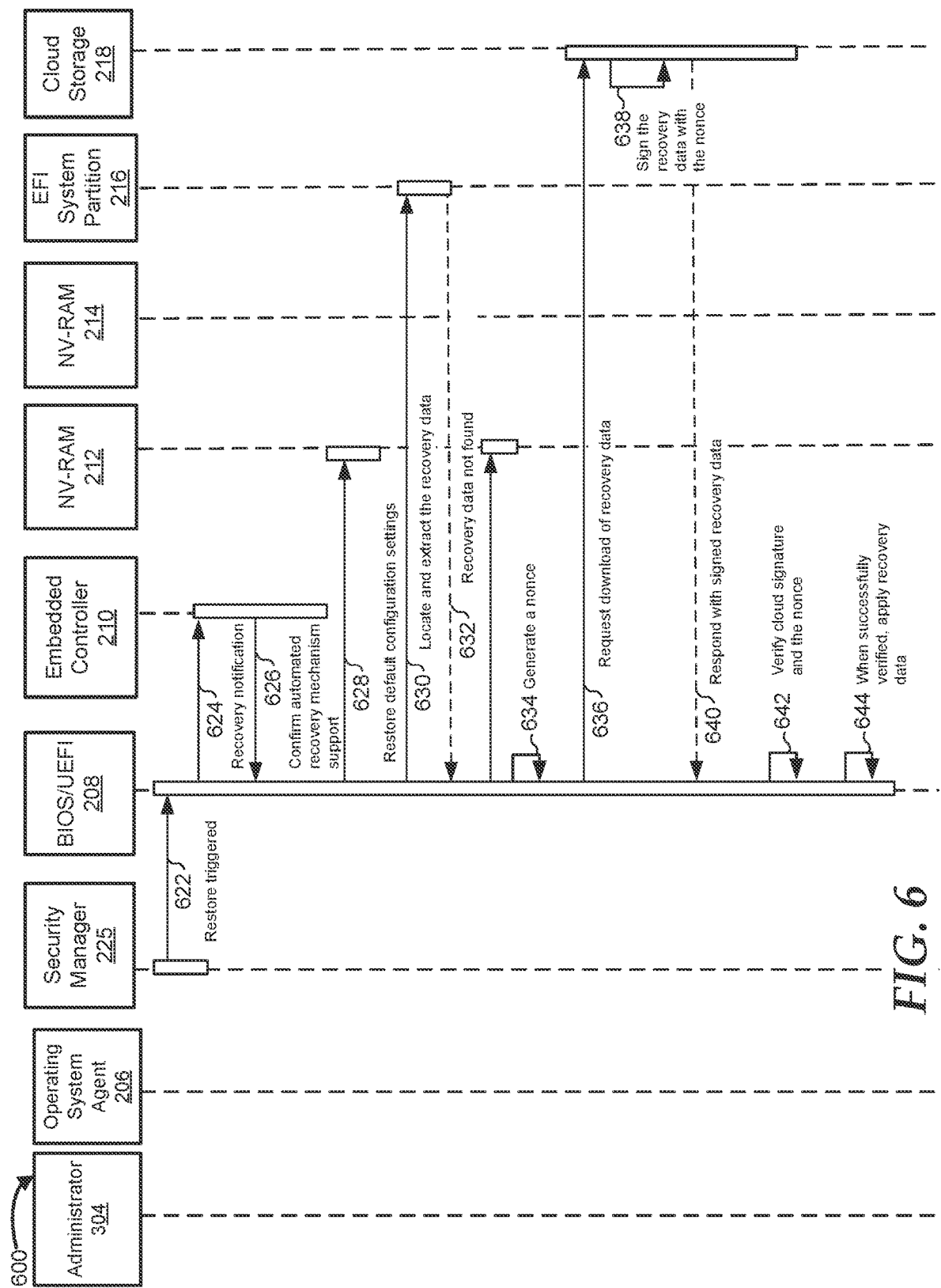
FIG. 6 is a swim lane diagram illustrating a system for restoration of firmware data, according to an embodiment of the present disclosure.

FIG. 6 shows a swim lane diagram 600 for restoring firmware data at an information handling system. At 622, security manager 225 detects a security issue, such as a malicious attack on the information handling system, which then notifies BIOS 208 of the detected security issue. At this point, a restore is triggered. At 624, BIOS 208 may check if the automated recovery mechanism is enabled or supported. If the automated recovery mechanism is enabled or supported, then BIOS 208 may notify embedded controller 210 of the recovery. At 626, embedded controller 210 may confirm support for the automated recovery mechanism. At 628, BIOS 208 may purge firmware data stored in NV-RAM 212 and restore default configuration settings. In addition, BIOS 208 may set a flag to prevent the information handling system to boot to the operating system.

At 632, BIOS 208 may locate recovery data in EFI system partition 216. At 632, if the recovery data is not stored in EFI system partition 216, then EFI system partition 216 may respond with an acknowledgment that recovery data was not found. For example, EFI system partition 216 may respond with a negative acknowledgment. At 634, BIOS 208 may generate a nonce, which may be a random number. At 636, BIOS 208 may send a download request of the recovery data to cloud storage 218. BIOS 208 may include the nonce with the request. At 638, cloud storage 218 may sign the recovery data with the nonce, and at 640 respond to BIOS 208 with the signed recovery data. At 642, BIOS 208 may verify the signature and if the verification is successful, apply the signed recovery data to the information handling system, thereby restoring the firmware data.

The swim lane diagrams above illustrate certain responsibilities, communications, and specific operations of components of an environment of an information handling system for restoration of a platform configuration snapshot. However, one of skill in the art will recognize that the responsibilities, communications, and specific operations of the components may be provided in a similar manner other than those depicted herein. In addition, other operations may be performed in place of or in addition to the operations illustrated and described herein while remaining within the scope of the present disclosure.

For purposes of this disclosure, EFI and UEFI are used interchangeably. Also, as used herein, legacy BIOS, as well as UEFI BIOS are referred to as BIOS for simplicity. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   in response to detecting, by a processor, a change in a configuration setting, notifying an embedded controller to take a first snapshot of firmware data;
   determining a location of the firmware data in a non-volatile random access memory;
   determining an unused memory region in the non-volatile random access memory;
   extracting embedded controller firmware data from the non-volatile random access memory;
   encrypting the embedded controller firmware data;
   extracting basic input/output system (BIOS) firmware data from the non-volatile random access memory;
   combining the encrypted embedded controller firmware data and the BIOS firmware data into a binary large object; and
   encrypting the binary large object and storing the encrypted binary large object in the unused memory region of the non-volatile random access memory.

2. The method of claim 1, further comprising performing a garbage collection process of the non-volatile random access memory.

3. The method of claim 1, further comprising storing the binary large object in an extensible firmware interface system partition.

4. The method of claim 1, further comprising storing the binary large object in a cloud data storage.

5. The method of claim 1, further comprising sending an address of the firmware data to the embedded controller.

6. The method of claim 1, further comprising determining an address of the embedded controller firmware data in the non-volatile random access memory.

7. The method of claim 1, further comprising determining an address of the BIOS firmware data in the non-volatile random access memory.

8. The method of claim 1, wherein the encrypting of the binary large object is performed using a hardware unique identifier.

9. An information handling system, comprising:
a basic input/output system (BIOS) configured to notify an embedded controller to take a first snapshot of firmware data, in response to detecting a change in a configuration setting; and
the embedded controller configured to:
determine a location of the firmware data in a non-volatile random access memory;
determine an unused memory region in the non-volatile random access memory;
extract embedded controller firmware data from the non-volatile random access memory;
encrypt the embedded controller firmware data;
extract basic input/output system (BIOS) firmware data from the non-volatile random access memory;
combine the encrypted embedded controller firmware data and the BIOS firmware data into a binary large object; and
encrypt the binary large object and storing the encrypted binary large object in the unused memory region of the non-volatile random access memory.

10. The information handling system of claim 9, wherein recovery data is stored in an extensible firmware interface system partition.

11. The information handling system of claim 9, wherein recovery data is stored in a cloud data storage.

12. The information handling system of claim 9, wherein the embedded controller is further configured to write recovery data to a memory region in the non-volatile random access memory.

13. The information handling system of claim 9, wherein verification that recovery data is valid is based on a hardware unique identifier.

14. A non-transitory computer-readable medium to store instructions that are executable to perform operations comprising:

in response to detecting a change in a configuration setting, notifying an embedded controller to take a first snapshot of firmware data;
determining a location of the firmware data in a non-volatile random access memory;
determining an unused memory region in the non-volatile random access memory;
extracting embedded controller firmware data from the non-volatile random access memory;
encrypting the extracted embedded controller firmware data;
extracting basic input/output system (BIOS) firmware data from the non-volatile random access memory;
combining the encrypted embedded controller firmware data and the BIOS firmware data into a binary large object; and
encrypting the binary large object and storing the encrypted binary large object in the unused memory region of the non-volatile random access memory.

15. The non-transitory computer-readable medium of claim 14, wherein the operations further comprises performing a garbage collection process of the non-volatile random access memory.

16. The non-transitory computer-readable medium of claim 14, wherein the operations further comprises storing the binary large object in an extensible firmware interface system partition.

17. The non-transitory computer-readable medium of claim 14, wherein the operations further comprises storing the binary large object in a cloud data storage.

18. The non-transitory computer-readable medium of claim 14, wherein the operations further comprises performing a garbage collection operation at the non-volatile random access memory.

19. The non-transitory computer-readable medium of claim 14, wherein the operations further comprises an address of the BIOS firmware data in the non-volatile random access memory.

20. The non-transitory computer-readable medium of claim 14, wherein the encrypting of the binary large object is performed using a hardware unique identifier.

* * * * *